(12) United States Patent
Huang

(10) Patent No.: US 9,705,323 B2
(45) Date of Patent: *Jul. 11, 2017

(54) POWER SUPPLY SYSTEM AND POWER CONTROL CIRCUIT THEREOF

(71) Applicant: VIA TECHNOLOGIES, INC., New Taipei (TW)

(72) Inventor: Wei-Te Huang, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/061,176

(22) Filed: Mar. 4, 2016

(65) Prior Publication Data

US 2016/0190804 A1 Jun. 30, 2016

Related U.S. Application Data

(63) Continuation of application No. 14/046,653, filed on Oct. 4, 2013, now Pat. No. 9,312,693.

(60) Provisional application No. 61/711,267, filed on Oct. 9, 2012.

(30) Foreign Application Priority Data

Jan. 10, 2013 (EP) .................................... 13150765

(51) Int. Cl.
*H02J 1/06* (2006.01)
*H02M 1/36* (2007.01)
*G06F 1/26* (2006.01)
*H02M 1/00* (2006.01)

(52) U.S. Cl.
CPC ................. *H02J 1/06* (2013.01); *G06F 1/26* (2013.01); *H02M 1/36* (2013.01); *H02M 2001/0096* (2013.01); *Y10T 307/766* (2015.04)

(58) Field of Classification Search
CPC .......... H02J 1/00; G06F 1/26; Y10T 307/766; H02M 2001/0096
USPC ....................................................... 307/140
See application file for complete search history.

(56) References Cited

U.S. PATENT DOCUMENTS 5,463,261 A 10/1995 Skarda et al.
9,312,693 B2 * 4/2016 Huang .................... H02M 1/36

FOREIGN PATENT DOCUMENTS

EP 2 378 621 10/2011

* cited by examiner

*Primary Examiner* — Robert Deberadinis
(74) *Attorney, Agent, or Firm* — McClure, Qualey & Rodack, LLP

(57) ABSTRACT

A power control includes a switch, having a first terminal coupled to a power supply, a second terminal coupled to a voltage converter, and a control terminal and a first switch controller coupled to the control terminal of the switch and the chipset, controlling the switch to couple the power supply to the voltage converter according to a turning-on event of the power supply system, wherein the first switch controller comprises a power-on switch. The switch does not couple the power supply to the voltage converter before the turning-on event of the power supply system. The power control circuit is configured such that when the power supply is plugged in, but before the power-on switch is conducting during the turning-on event of the power supply system, the power supply is isolated from the voltage converter and the chipset.

14 Claims, 4 Drawing Sheets

US 9,705,323 B2

POWER SUPPLY SYSTEM AND POWER CONTROL CIRCUIT THEREOF

CROSS REFERENCE TO RELATED APPLICATIONS

This application is a Continuation application of pending U.S. application Ser. No. 14/046,653, filed on Oct. 4, 2013, which claims priority of U.S. Provisional Application No. 61/711,267, filed on Oct. 9, 2012, and European Patent Office Application No. 13150765.9, filed on Jan. 10, 2013, the entirety of which is incorporated by reference herein.

BACKGROUND OF THE INVENTION

Field of the Invention

The invention relates to a power supply system, and more particularly to a power control circuit thereof.

Description of the Related Art

Power supply and energy savings are important issues for electronic and electrical appliances. In a conventional power supply system, a power supply is directly connected to a voltage converter, which converts a supply voltage of the power supply to a desired voltage and supplies the desired voltage to an electronic device, such as a chipset of the electronic device. When the power supply is plugged in, there is power consumption even though the system is switched off or is not performing its primary function (for example, in a standby mode). This kind of power consumption, which is also called 'standby power consumption', may be caused by the power supply (which converts AC voltages into DC voltages), circuits and sensors that receive remote signals (such as a Wake-on-LAN signal), and soft keypads and displays that include LED status lights. For saving energy, the standby power consumption of devices is limited to be within a specific range; especially in developed countries having more stringent standards. Accordingly, power loss is an important issue for power supply systems.

BRIEF SUMMARY OF THE INVENTION

An embodiment of the invention provides a power supply system for supplying power to a chipset of an electronic device, comprising: a voltage converter, converting a supply voltage of a power supply into a predetermined voltage and outputting the predetermined voltage to the chipset; and a power control circuit coupled between the voltage converter and the power supply, comprising: a switch, having a first terminal coupled to the power supply, a second terminal coupled to the voltage converter, and a control terminal; and a first switch controller coupled to the control terminal of the switch and the chipset, controlling the switch to couple the power supply to the voltage converter according to a turning-on event of the power supply system, wherein the switch does not couple the power supply to the voltage converter before the turning-on event of the power supply system.

Another embodiment of the invention provides a power control circuit for a power supply system supplying power to a chipset of an electronic device, wherein the power supply system comprises a power supply and a voltage converter, and the voltage converter converts a supply voltage of the power supply into a predetermined voltage and outputs the predetermined voltage to the chipset, comprising: a P-type transistor switch, having a first terminal coupled to the power supply, a second terminal coupled to the voltage converter and a control terminal; a power-on switch, having a first terminal coupled to a reference voltage and a second terminal; and a first diode, having a cathode coupled to the second terminal of the power-on switch and an anode coupled to the control terminal of the P-type transistor switch, wherein, when the power-on switch is turned on, the P-type transistor switch couples the power supply to the voltage converter, wherein the P-type transistor switch does not couple the power supply to the voltage converter before the turning-on event of the power supply system.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
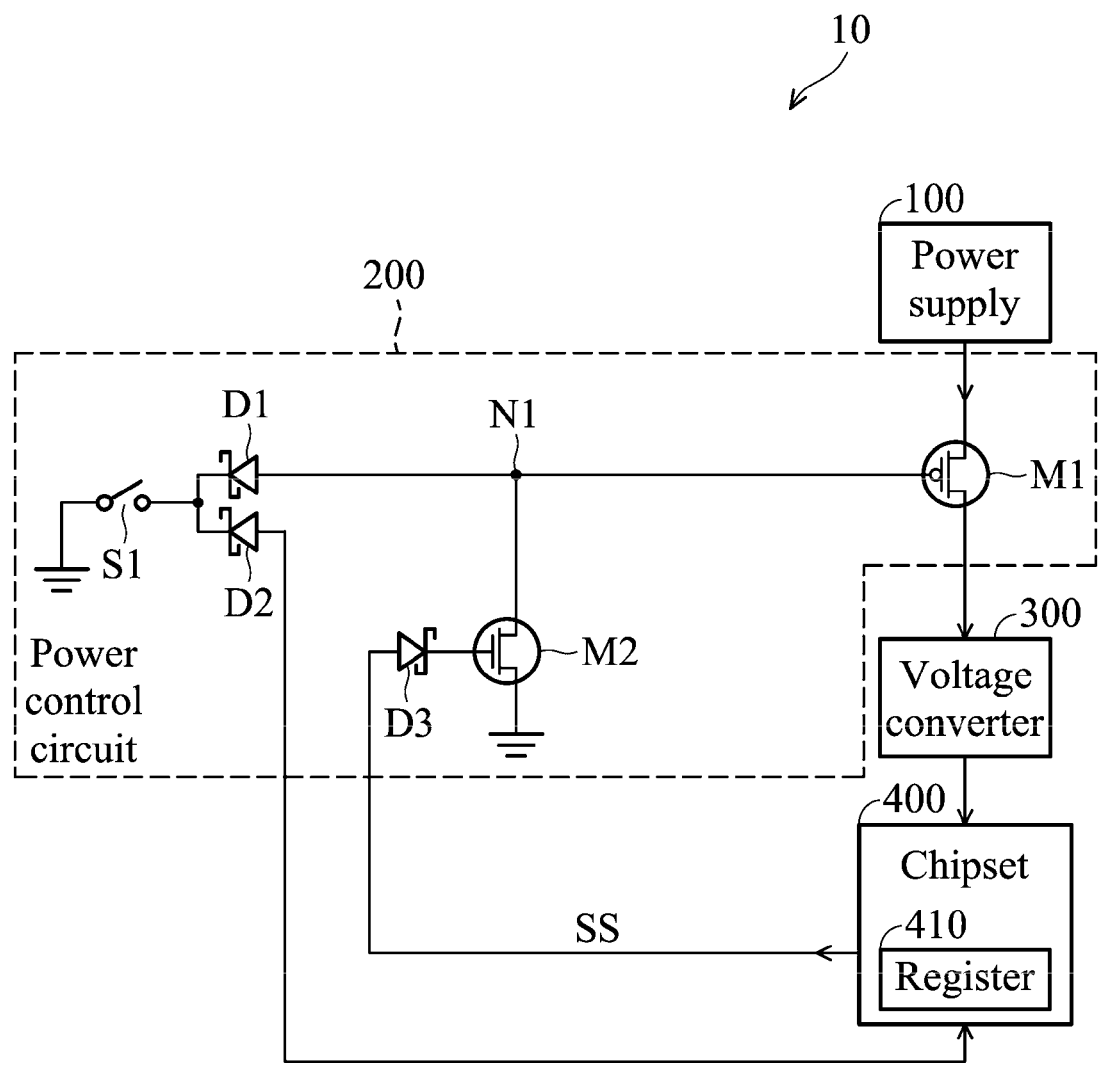
FIG. 1 illustrates a block diagram of a power supply system according to an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

FIG. 1 illustrates a block diagram of a power supply system 10 according to an embodiment of the invention. The power supply system 10 comprises a power supply 100, a power control circuit 200, a voltage converter 300 and a chipset 400 of an electronic device. In one embodiment, the power supply 100 may provide DC voltage; in another embodiment, the power supply 100 may convert an AC voltage received from an external source, such as a plug, into a DC voltage. Moreover, the power supply 100 may be an external power source or an internal power source such as a rechargeable battery. The power control circuit 200 is connected between the power supply 100 and the voltage converter 300. The voltage converter 300 converts a supply voltage of the power supply 100 into a predetermined voltage and supplies the predetermined voltage to the chipset 400 for the operation of the chipset. The power control circuit 200 comprises a power-on switch S1, a P-type transistor switch M1, diodes D1, D2 and D3 and an N-type transistor switch M2. The power-on switch S1 is a switch to turn on the power supply system 10. A first terminal of the P-type transistor switch M1 is coupled to the power supply 100, a second terminal of the P-type transistor switch M1 is coupled to the voltage converter 300, and a control terminal (that is, a gate terminal) of the P-type transistor switch M1 is coupled to a node N1. The node N1 is coupled to an anode of the diode D1, a cathode of the diode D1 is coupled to one terminal of the power-on switch S1, and the other terminal of the power-on switch S1 is coupled to a ground voltage. A cathode of the diode D2 is coupled to the power-on switch S1, and an anode of the diode D2 is coupled to the chipset 400. A first terminal of the N-type transistor switch M2 is coupled to the node N1, a second terminal of the N-type transistor switch M2 is coupled to the ground voltage, and a control terminal of the N-type transistor switch M2 is coupled to a cathode of the diode D3. An anode of the diode D3 is coupled to the chipset 400.

The power-on switch S1 and the diode D1 forms a first switch controller to control the P-type transistor switch M1. When the power supply 100 is plugged in and the power-on switch S1 is turned on, the cathode of the diode D1 is coupled to the ground voltage and then the diode D1 is conducting. Therefore, the voltage of the node N1 is pulled down to the ground voltage, and thus, the P-type transistor switch M1 couples the power supply 100 to the voltage converter 300. Accordingly, the voltage converter 300 can receive the supply voltage of the power supply 100 via the conducting P-type transistor switch M1, convert the supply voltage of the power supply 100 into the predetermined voltage, and then output the predetermined voltage to the chipset 400 to allow the chipset to operate. Furthermore, when the power-on switch S1 is turned on, the diode D2 provides the ground voltage to the chipset 400 to inform the chipset 400 of the turning-on of the power-on switch S1. In an example, when the chipset 400 is informed of the turning-on of the power-on switch S1, a status value stored in a register 410 of the chipset 400 records the turning-on event.

The power-on switch S1 may be a power-on button having conduction only for a short period of time when the button is being pressed. The N-type transistor switch M2 and the diode D3 forms a second switch controller, to ensure that conduction of the P-type transistor switch M1 continues while the chipset 400 is operating even when the power-on switch S1 is not conducting. The chipset 400 continuously outputs a start up signal SS at a high voltage level when the chipset 400 is operating. Thus, the diode D3 is conducting and the N-type transistor switch M2 is conducting as well, and the voltage of the node N1 keeps being coupled to the ground voltage via the conducting N-type transistor switch M2. Therefore, the P-type transistor switch M1 maintains the coupling of the power supply 100 to the voltage converter 300 while the chipset 400 is in operation to ensure that the predetermined voltage is applied to the chipset 400.

In addition, when the power supply 100 is plugged in and before the power-on switch is turned-on, since there is no conduction via either the power-on switch S1 or the N-type transistor switch M2, the voltage of the node N1 is not coupled to the ground voltage. As a result, the P-type transistor switch M1 is not conducting, and thus, the power supply is isolated from the voltage converter 300 and the chipset 400. Therefore, there is no standby power consumption before the power supply system 10 is turned on.

Figure 2A:
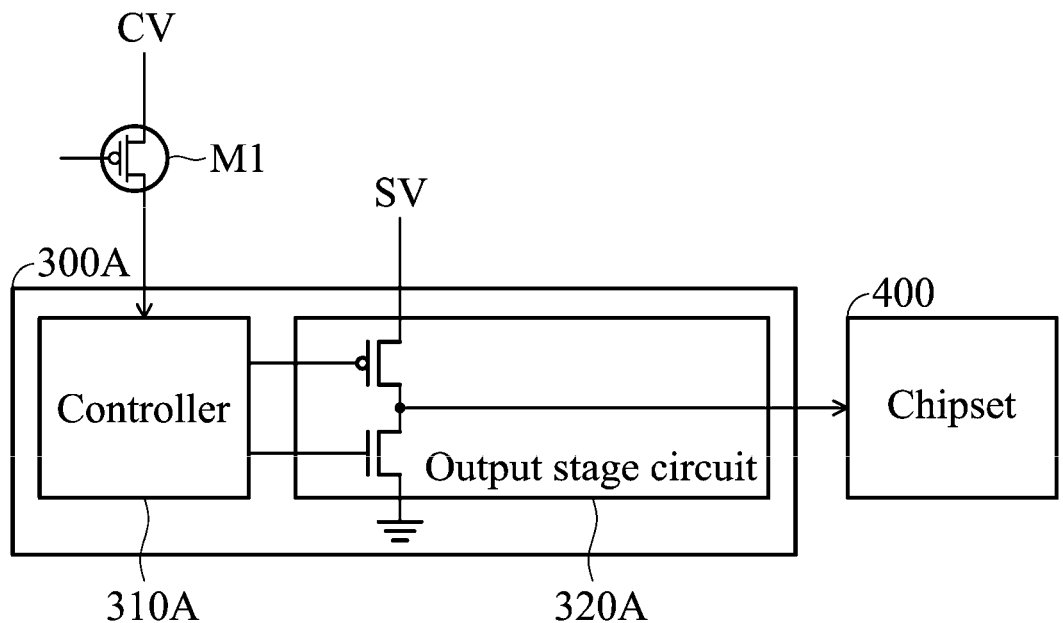
FIG. 2A illustrates a block diagram of a voltage converter according to an embodiment of the invention.

FIG. 2A illustrates a block diagram of a voltage converter 300A according an embodiment of the invention. The voltage converter 300A comprises a controller 310A and an output stage circuit 320A, wherein the output stage circuit 320A comprises a switch circuit. In one example, the switch circuit comprises a pull-up switch to couple an output terminal of the voltage converter 300A to a supply voltage SV and a pull-down switch to couple the output terminal to a ground voltage, and the controller 310A may generate non-overlapping control signals to prevent the switches from conducting at the same time. In another example, the controller 310A may generate control signals to drive the switch circuit for pulse width modulation (PWM). The output stage circuit 320A receives the supply voltage SV of the power supply 100 and the switch circuit generates the predetermined voltage, which is converted from the supply voltage SV of the power supply 100, at the output terminal of the voltage converter 300A coupled to the chipset 400. The controller 310A is activated by an operation voltage CV outputted from the power supply 100 via the conducting P-type transistor switch M1 and controls the output stage circuit 320A to generate the predetermined voltage at the output terminal. The operation voltage CV may provide the voltage required for the operation of the controller 310A. Both the supply voltage SV and the operation voltage CV are provided by the power supply 100. In one example, the supply voltage SV and the operation voltage CV may have the same voltage; in another example, the supply voltage SV and the operation voltage CV may not have the same voltage.

Figure 2B:
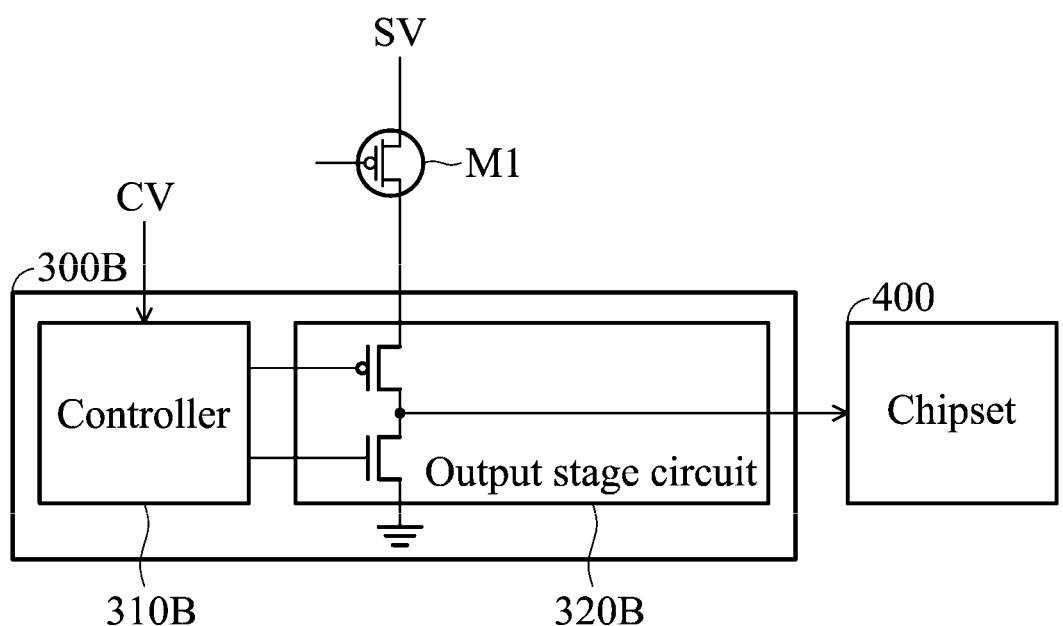
FIG. 2B illustrates a block diagram of a voltage converter according to another embodiment of the invention.

FIG. 2B illustrates a block diagram of a voltage converter 300B according another embodiment of the invention. The voltage converter 300B comprises a controller 310B and an output stage circuit 320B comprising a switch circuit. The output stage circuit 320B receives the supply voltage SV of the power supply 100 via the conducting P-type transistor switch M1 and the switch circuit generates the predetermined voltage, which is converted from the supply voltage SV of the power supply 100, at an output terminal of the voltage converter 300B coupled to the chipset 400. The controller 310B is activated by an operation voltage CV outputted from the power supply 100 and controls the output stage circuit 320A to generate the predetermined voltage at the output terminal. In still another embodiment, there may be two P-type transistor switches, whose control terminals both coupled to the node N1, coupling the operation voltage CV and the supply voltage SV to the controller 310A and the output stage circuit 320A, respectively.

Figure 3:
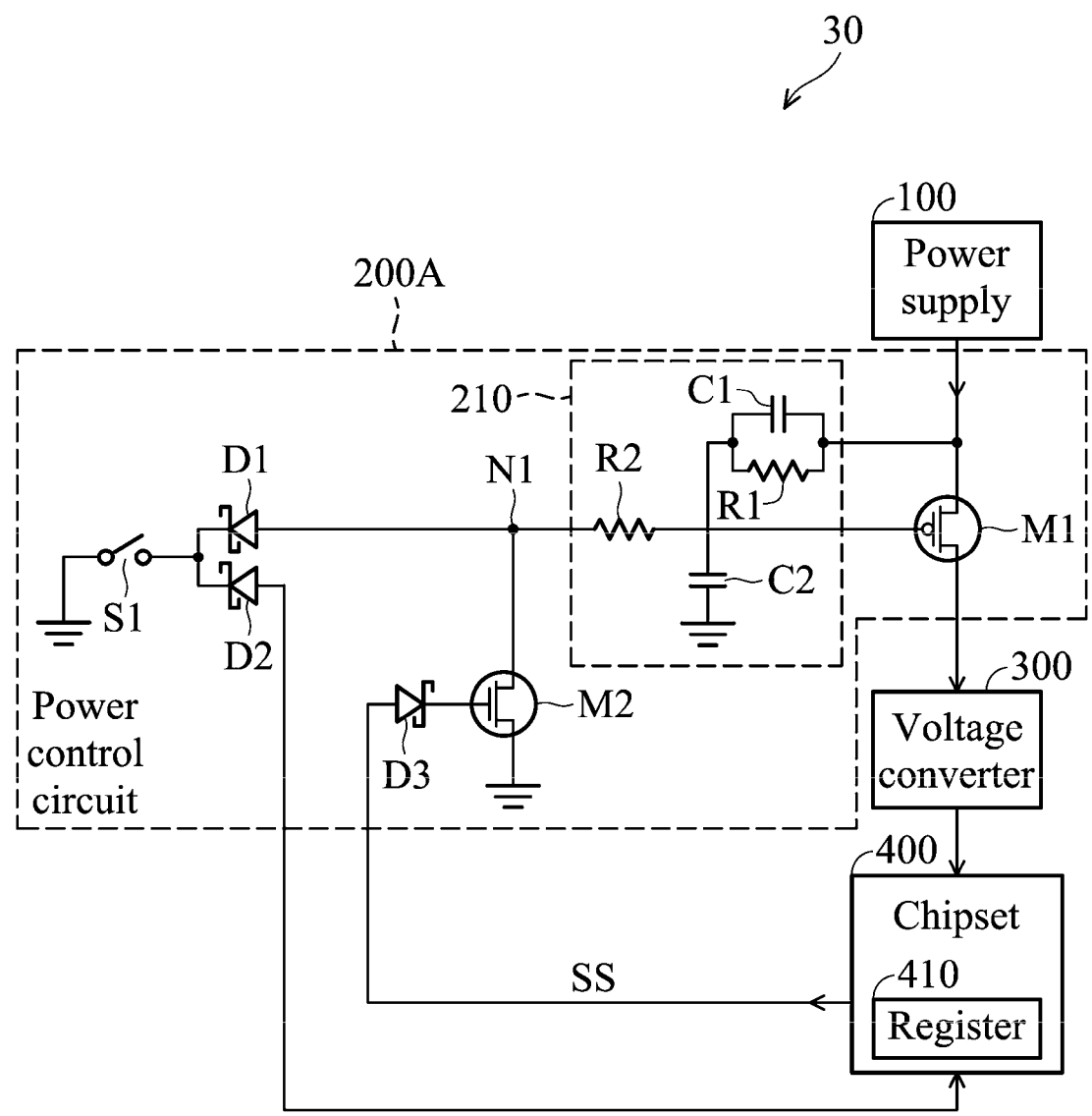
FIG. 3 illustrates a block diagram of a power supply system according to another embodiment of the invention.

FIG. 3 illustrates a block diagram of a power supply system 30 according to an embodiment of the invention. The power supply system 30 comprises a power supply 100, a power control circuit 200A, a voltage converter 300 and a chipset 400 of an electronic device. The power supply 100, the voltage converter 300 and the chipset 400 are similar to that in FIG. 3 and will not be described again for brevity. The power control circuit 200A is coupled between the power supply 100 and the voltage converter 300 and is similar to the power control circuit 200 in FIG. 2, and the similar parts will not be described again. The difference between the power control circuit 200A and the power control circuit 200 is that the power control circuit 200A further comprises a power recovery circuit 210 to automatically restart the power supply system 30 after a power failure incident occurs. The power recovery circuit comprises capacitors C1 and C2 and resistors R1 and R2. The capacitor C1 and the resistor R1 coupled in parallel are coupled between the first terminal and the control terminal of the P-type transistor switch M1. The capacitor C2 is coupled between the control terminal of the P-type transistor switch M1 and the ground voltage. The resistor R2 is a current-limiting resistor coupled between the node N1 and the control terminal of the P-type transistor switch M1 and may be discarded in some examples. The Basic Input/Output System (BIOS) of the electronic device may be configured to enable or disable an auto-restart function in advance. The status of enabling or disabling the auto-restart function may be stored in the register 410 of the chipset 400. When power failure occurs, the power supply 100 does not provide the supply voltage, and the chipset 400 does not operate, and thus, the chipset 400 does not output the start up signal SS. Therefore, the N-type transistor switch M2 is not conducting. In this situation, the power recovery circuit 210 maintains the voltage of the control terminal of the P-type transistor switch M1 for a certain period of time. When power is restored, the conduction of the P-type transistor switch M1 is temporarily maintained via the maintained voltage at the control terminal of the P-type transistor switch M1, and thus, the supply voltage is provided to the voltage converter 300 and then the predetermined voltage is supplied to the chipset 400. At this time, if the auto-restart function is enabled (may be determined by accessing the status of enabling or disabling the auto-restart function in the register 410), the chipset 400 restarts to continuously output the start up signal SS at the high voltage level for conduction of the N-type transistor switch M2. Accordingly, when power is restored, the P-type transistor switch M1 maintains the coupling of the power supply 100 to the voltage converter 300 due to the conduction of the N-type transistor switch M2 even though the power-on switch S1 is not turned on, allowing the power supply system 30 to automatically restart. Furthermore, if the auto-restart function is disabled, the chipset 400 does not output the startup signal SS, and thus, the power supply system 30 does not automatically restart after the power has been restored.

Figure 4:
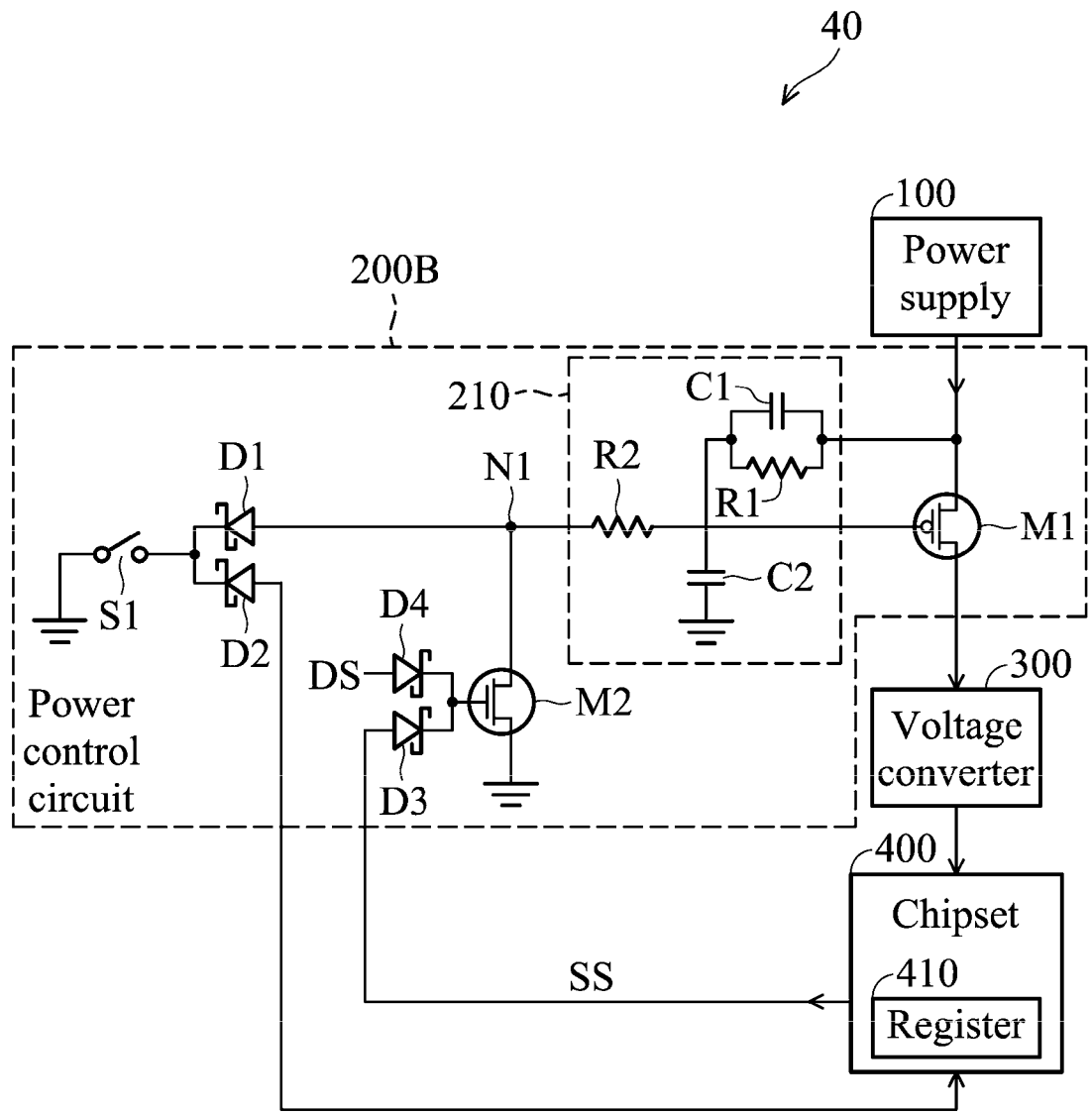
FIG. 4 illustrates a block diagram of a power supply system according to still another embodiment of the invention.

FIG. 4 illustrates a block diagram of a power supply system 40 according to an embodiment of the invention. The power supply system 40 comprises a power supply 100, a power control circuit 200B, a voltage converter 300 and a chipset 400. The power control circuit 200B, coupled between the power supply 100 and the voltage converter 300, is similar to the power control circuit 200A in FIG. 3. The difference between the power control circuit 200B and the power control circuit 200A is that the power control circuit 200B further comprises a diode D4. A cathode of the diode D4 is coupled to the control terminal of the N-type transistor switch M2 and an anode of the diode D4 receives a disable signal DS. The power supply system 40 may be configured to disable the above power-saving function so that the power supply 100 is constantly coupled to the voltage converter 300 without activating the power-on switch. In one example, the power-saving function may be disabled to provide a Wake-on LAN (WOL) function, allowing the chipset 400 to be turned on by a WOL signal transmitted from a remote location through a network. The status of enabling or disabling the WOL function may be stored in a register of a local area network (LAN) chip or other IC chips (not shown). The disable signal DS may be provided from a super input/output chip or other IC chips (not shown). After the WOL function of the power supply system 40 is enabled, the disable signal DS remains at the high voltage level for conduction of the N-type transistor switch M2 even after the chipset 400 is turned off. The P-type transistor switch M1 is thus conducting due to the high-voltage-level disable signal DS and constantly couples the power supply 100 to the voltage converter 300 after the chipset 400 is turned off. Therefore, after the WOL function is enabled, when the WOL signal is received (by, for example, the LAN chip) via the network, the chipset 400 may start the turn-on process without the need of actually activating the power-on switch. If the WOL function of the power supply system 40 is disabled, the disable signal DS remains at a low voltage level, and thus, the power supply 100 is not coupled to the voltage converter 300 to achieve the power-saving function.

In the embodiments described above, the P-type transistor switch M1 and the N-type transistor switch M2 may be field-effect transistors or bipolar junction transistors. This designation of the switches M1 and M2 as P-type and N-type transistors is made for the purpose of illustrating the general principles of the invention and should not be taken in a limiting sense. The switches M1 and M2 may cover different types or different devices performing similar switching functions. The diodes D1, D2 and D3 may be Schottky diodes. In another embodiment, a resistive voltage divider may be coupled between the cathode of the diode D3, the control terminal of the N-type transistor switch M2 and the ground voltage to adjust the voltage applied to the control terminal of the N-type transistor switch M2.

In summary, a power supply system for reducing the standby power consumption to save energy is provided. When the power supply is plugged in but before the power-on switch is turned on, the power supply is isolated from the voltage converter and the chipset, and therefore there is no standby power consumption. The power supply system may be modified to provide functions such as the automatic restart after power failure or the disabling of the power-saving function for purposes such as WOL. The power supply system may be employed in any electric system to reduce power consumption, and the chipset described in above may include one or a group of integrated circuits or chips, which may be employed in energy-using products such as computers, displays, air conditioning systems, household appliances, and so on.

While the invention has been described by ways of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power control circuit for a power supply system supplying power to a chipset of an electronic device, wherein the power supply system comprises a power supply and a voltage converter, and the voltage converter converts a supply voltage of the power supply into a predetermined voltage and outputs the predetermined voltage to the chipset, comprising:
a switch, having a first terminal coupled to the power supply, a second terminal coupled to the voltage converter, and a control terminal; and
a first switch controller coupled to the control terminal of the switch and the chipset, controlling the switch to couple the power supply to the voltage converter according to a turning-on event of the power supply system, wherein the first switch controller comprises a power-on switch,
wherein the switch does not couple the power supply to the voltage converter before the turning-on event of the power supply system, and wherein the power control circuit is configured such that when the power supply is plugged in but before the power-on switch is conducting during the turning-on event of the power supply system, the power supply is isolated from the voltage converter and the chipset.

2. The power control circuit as claimed in claim 1, wherein the power-on switch is conducting only when the power-on switch is being pressed during the turning-on event of the power supply system.

3. The power control circuit as claimed in claim 1, wherein the switch is a P-type transistor switch.

4. The power control circuit as claimed in claim 1, wherein the power-on switch has a first terminal coupled to a reference voltage and a second terminal, wherein the first switch controller further comprises:
 a first diode, having a cathode coupled to the second terminal of the power-on switch and an anode coupled to the control terminal of the switch,
 wherein after the power-on switch conducts, the switch couples the power supply to the voltage converter.

5. The power control circuit as claimed in claim 4, wherein the power control circuit further comprises:
 a second diode, having a cathode coupled to the second terminal of the power-on switch and an anode coupled to the chipset, and informing the chipset of the turning-on event of the power supply system.

6. The power control circuit as claimed in claim 5, wherein a status value is stored in a status register of the chipset to record the turning-on event of the power supply system.

7. The power control circuit as claimed in claim 1, wherein the power control circuit further comprises:
 a second switch controller coupled between the control terminal of the switch and the chipset, controlling the switch to maintain the coupling of the power supply to the voltage converter when the chipset is in operation.

8. The power control circuit as claimed in claim 7, wherein the second switch controller further comprises:
 a N-type transistor switch, having a first terminal coupled to the control terminal of the switch, a second terminal coupled to a reference voltage, and a control terminal; and
 a third diode, having a cathode coupled to the control terminal of the N-type transistor switch and an anode coupled to the chipset,
 wherein, when the chipset is in operation, the chipset continuously outputs a high-voltage-level signal to the N-type transistor switch via the third diode.

9. The power control circuit as claimed in claim 8, wherein the power control circuit further comprises:
 a power recovery circuit controlling the switch to couple the power supply to the voltage converter when the chipset does not output the high-voltage-level signal to the N-type transistor switch during a temporary failure of the power supply,
 wherein after the temporary failure of the power supply ends, the chipset outputs the high-voltage-level signal to the N-type transistor switch via the third diode according to a restart enable status stored in a restart register of the chipset.

10. The power control circuit as claimed in claim 9, wherein the power recovery circuit comprises:
 a first capacitor coupled between the first terminal and the control terminal of the switch;
 a resistor coupled between the first terminal and the control terminal of the switch; and
 a second capacitor coupled between the control terminal of the switch and the reference voltage.

11. The power control circuit as claimed in claim 8, wherein the power control circuit further comprises:
 a fourth diode, having a cathode coupled to the control terminal of the N-type transistor switch and an anode receiving a disable signal,
 wherein when the disable signal is at a high voltage level, the chipset is turned on according to a wake-on-LAN signal received via a network without the power-on switch being conducting.

12. The power control circuit as claimed in claim 1, wherein the voltage converter comprises:
 an output stage circuit coupled to the chipset and the power supply, receiving the supply voltage of the power supply; and
 a controller coupled to the output stage circuit and the second terminal of the switch, receiving an operation voltage outputted from the power supply via the switch, and controlling the output stage circuit to output the predetermined voltage to the chip set.

13. The power control circuit as claimed in claim 1, wherein the voltage converter comprises:
 an output stage circuit coupled to the chipset and the second terminal of the switch, receiving the supply voltage of the power supply via the switch; and
 a controller coupled to the output stage circuit and the power supply, receiving an operation voltage outputted from the power supply, and controlling the output stage circuit to output the predetermined voltage to the chipset.

14. The power control circuit as claimed in claim 1, further comprising an auxiliary switch having a control terminal coupled to the control terminal of the switch, wherein the voltage converter comprises:
 an output stage circuit coupled to the chipset and one of the second terminal of the switch and a second terminal of the auxiliary switch, receiving the supply voltage of the power supply via the corresponding one of the switch and the auxiliary switch; and
 a controller coupled to the output stage circuit and the other one of the second terminal of the switch and the second terminal of the auxiliary switch, receiving an operation voltage outputted from the power supply via the other corresponding one of the switch and the auxiliary switch, and controlling the output stage circuit to output the predetermined voltage to the chipset.

* * * * *